Jan. 13, 1970          E. M. EGLI          3,489,347
THERMOSTATIC FLOW MIXER
Filed July 26, 1967                3 Sheets-Sheet 1

ERNST M. EGLI
INVENTOR.

BY Karl F. Ross

ATTORNEY

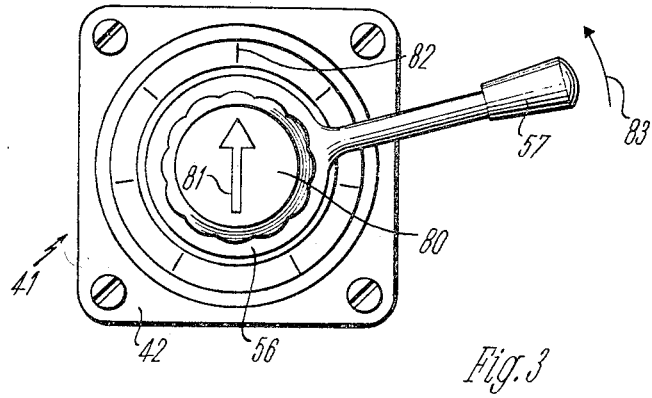
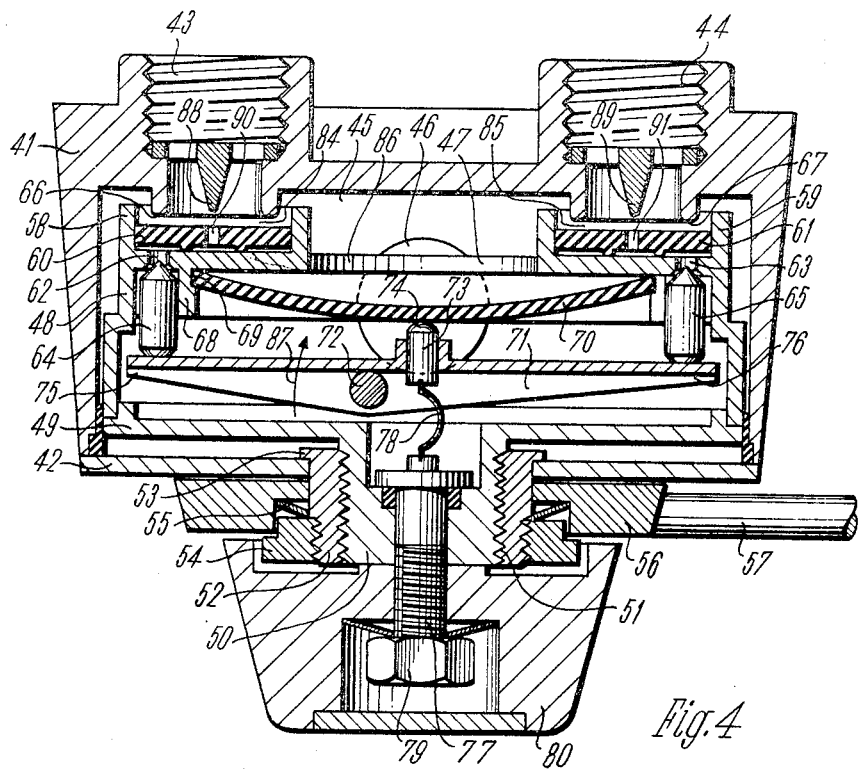

Jan. 13, 1970   E. M. EGLI   3,489,347
THERMOSTATIC FLOW MIXER
Filed July 26, 1967   3 Sheets-Sheet 3

ERNST M. EGLI
INVENTOR.

BY   Karl F. Ross

ATTORNEY

United States Patent Office 3,489,347
Patented Jan. 13, 1970

3,489,347
THERMOSTATIC FLOW MIXER
Ernst M. Egli, Zurich, Switzerland, assignor to Patinvest, Patent und Investment A.G., Chur, Switzerland
Filed July 26, 1967, Ser. No. 656,133
Claims priority, application Germany, July 29, 1966, P 40,084
Int. Cl. G05d 23/02; F16k 19/00
U.S. Cl. 236—12                                    10 Claims

ABSTRACT OF THE DISCLOSURE

A thermostatically controlled flow mixer which comprises a new valve structure and also a new type of thermostat which, although especially suitable for use in such a mixer, may also be employed for many other purposes. The flow mixer is provided with a pair of such valves which may be combined so as to form a twin valve and are operatively associated with the thermostat so that variations in the supply pressure of the two fluid currents as well as changes in temperature of these currents will be compensated.

---

The present invention relates primarily to a thermostatically controlled mixing appliance, also called a flow mixer, which is equipped with a new type of valves and also with a new type of thermostat which, although especially adapted for use in such a mixer, may also be employed for many other purposes.

The valve envisaged in the present case is of the general type which comprises a valve disk which faces and is movable relatively to a valve port and is provided with a disk-shaped gasket which is adapted to be moved toward and against a valve seat so as to vary the effective size of this valve port or to close it entirely.

The conventional valves of this type have the disadvantage that the rate of flow of the fluid passing through such a valve always depends upon the pressure at which this fluid is supplied and thus also upon variations of this pressure. In order to eliminate this dependency, additional devices have been devised which are responsive to the supply pressure of the respective fluid and restrict the size of the inlet passage of the valve when the supply pressure increases. Such additional devices, however, complicate such valves and render them rather expensive.

It is therefore one of the objects of the present invention to provide a valve of the general type as described above which is designed so as to maintain the rate of flow of the fluid passing through the valve as constant as possible even if the supply pressure of the fluid varies while requiring for this purpose no additional control means but only components of the valve itself.

According to the invention, this object is attained by designing the valve disk in the form of a cup whose bottom is provided with an outlet port which is adapted to be at least partly closed and wherein an elastic valve gasket which is preferably disk-shaped and located within this cup is slidable in its axial direction and has a surface area larger than the cross-sectional size of the valve inlet opening which is surrounded by the valve seat.

Another aspect of the present invention is the provision of a thermostat which is especially adapted for controlling the operation of at least one of the abovementioned valves and differs fundamentally from any of the conventional bimetal thermostats by consisting of a metallic supporting element, preferably in the form of a disk or the like, and of a second element, preferably in the form of a diaphragm, which consists of a thermoplastic material or in any event of a material which has a coefficient of thermal expansion different from that of the metallic supporting element and whose outer edge is connected to the outer edge of the supporting element while at least its central part is arcuately curved away from the supporting element. Such a thermostat of metal and plastic has the great advantage over a bimetal thermostat that the thermoplastic element has a coefficient of thermal expansion approximately ten times as large as that of a metal and that therefore at any change in temperature it will expand or contract considerably and thus effect a very large movement of the element or elements connected thereto. This, in turn, permits this themostat and, when used in connection with an appliance such as a flow mixer as hereafter described, this entire appliance as well to be made of a very small size. By reason of its large ratio of expansion, it also does not require any additional translating or transmitting means as are usually required in the conventional bimetal thermostats. Thanks to its curved but relatively flat shape, the plastic diaphragm or similar element is of light weight, requires only a small amount of material, and has a large surface area whereby this thermostat will respond much more quickly to any changes in temperature than any of the known thermostats. The heat absorption of the thermoplastic element is also very low which also contributes to a quick response of this thermostat to temperature changes.

The thermostat according to the invention as above described may act against spring pressure upon a rocker which is operatively associated with control elements, or one part of the thermostat itself may be in the forms of a rocker pivotable about an axis which is laterally offset from a support acting upon the other part of the thermostat. In order to permit the thermostat to be adjusted to the desired temperature, this support is preferably a setscrew. If a precision adjustment of the thermostat should be desired, this may be attained by designing the pivot bearing of the rocker so as to be adjustable in a direction transverse to its axis or by providing a setscrew intermediate the thermostat and at least one of the control elements acted upon by the thermostat.

As already stated, these two principal elements of the invention, i.e., the valve and the thermostat, are especially adapted to be employed in combination with each other in a mixing appliance designed to mix several fluid currents of different temperatures, as for example, hot and cold water, fed to this appliance through separate lines and discharged therefrom as a single current whose temperature may be regulated as desired.

While thermostatically controlled mixing appliances, so-called flow mixers, are generally known, the rate of flow from these mixers is regulated as already mentioned either by means of additional flow-control devices which are interposed in front of the valves or by employing fluid pressure for closing the valves. The thermostats of these appliances are generally in the form of bimetal elements or of liquid- or gas-filled expansion vessels or the like. These known mixing appliances are rather complicated and expensive since strong forces have to be produced therein and/or their elements have to move over considerable distances. Their service is also very difficult and they are hard to take apart which is very annoying especially since they may easily become clogged or fail to operate because of lime deposits or impurities in the water. Many of these known mixing appliances also require special valve elements in their outlet side which render them very sensitive to changes in pressure of the fluids or currents supplied to them. These mixing appliances therefore often require the different currents to have substantially the same supply pressure which is a condition that cannot always be fulfilled.

It is therefore another object of the invention to provide a mixing appliance which is of a very simple construction and may be easily installed and serviced and permits the rate of flow to be varied as desired regardless of the prevealing supply pressure of the different currents of fluids and regardless of the particular temperature selected. The mixing appliance according to the invention should be further designed so as to operate properly also if the supply pressures of the different currents differ very greatly from each other.

These objects are attained according to the invention by providing the mixing appliance with valves and a thermostat of the new type and with the inventive features previously mentioned and as will be subsequently described in greater detail. This mixing appliance or flow mixer may be equipped with two different control elements which operate independently of each other and one of which acts upon the valves so as to adjust the rate of flow while the other acts upon the thermostat and thus determines the particular mixture of the different currents which are supplied at different temperatures.

According to a particularly preferred embodiment of this mixing appliance, the valve according to the invention is a twin valve or even a multiple valve which different valve disks are adapted to be moved together by the same control element referred to above. The movements of the valve members operatively associated with the outlet ports which extend through the individual valve disks are then controlled by the thermostat. These valve members may be either in the form of valve pins which are supported on the rocker of the thermostat or in the form of resilient gaskets which are mounted on the rocker itself and may be biased against the outlet ports of the valve disks. If the mixing chamber of the appliance is directly connected to the outlet line without any intermediate valve member, the rate of flow will remain unaffected by the pressure within the mixing chamber and remain constant even if the supply pressures of the fluid currents differ from each other.

In order to prevent the operator of the mixing appliance from being scalded, it is advisable to design the adjusting element which acts upon the thermostat so as to make it easily movable up to a certain limit and movable beyond this limit only when a greater force is applied thereto. This predetermined limit, which may also be varied, may be marked by a special stop or the like.

A mixing appliance which is designed in accordance with the invention may be made of a very small size and inexpensive construction and not only satisfies the above-mentioned requirements but also insures a proper control of the rate of flow and temperature of the mixed current even if the pressures of the individual currents as supplied vary considerably. That this may be attained is due primarily to the fact that the invention permits, on the one hand, to compensate the changes in pressure of the individual currents of the fluids as supplied independently of their temperatures and that, on the other hand, the desired temperature of the mixed current may be adjusted and maintained by a control of the cross-sectional size of the valve passages by means of the associated thermostat. The appliance according to the invention may also be designed as a structural unit which may be easily installed or substituted for another flow mixer of a conventional type. Before such an installation it is, however, advisable to flush out and clean the two pipe lines and connections to which this unit is to be secured. The rate of flow and temperature may then be very quickly adjusted by a few simple manipulations after the unit has been installed. If at any subsequent time it should become necessary for any reason to remove this unit, such a removal will not affect the original adjustment of its elements and the unit may therefore be quickly reinstalled for further use.

These as well as additional features and advantages of the present invention will become more clearly apparent from the following detailed description thereof to be read with reference to the accompanying drawing in which:

FIGURE 3 shows a reduced front view of the mixing appliance according to the invention;

FIGURE 4 shows a longitudinal section of the mixing appliance according to FIGURE 3; while

Figure 1:
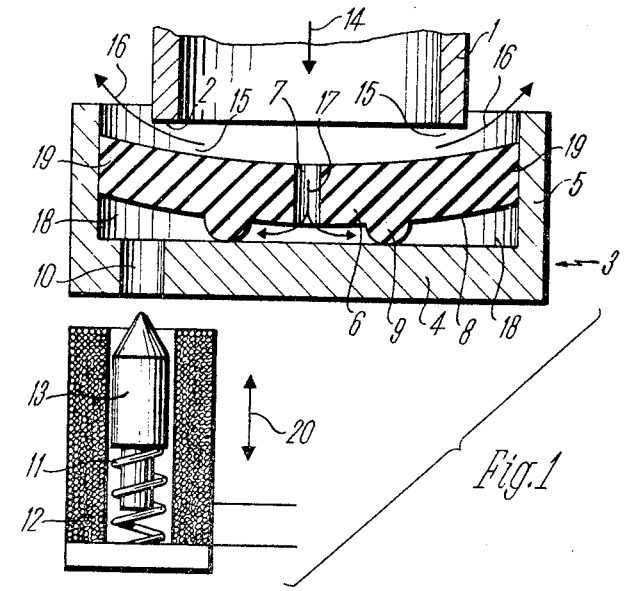
FIGURE 1 shows, in cross section, a diagrammatic illustration of a valve according to the invention.

As diagrammatically illustratd in FIGURE 1, the valve according to the invention comprises a valve inlet 1 whose lower end forms a valve seat 2. Opposite this valve seat 2 is a cylindrical cup 3 which has a bottom 4 and a side wall 5 and contains a disk-shaped gasket 6 which is slidable in the axial direction within the cup 3 and is provided with a central bore 7. The lower face 8 of this gasket 6 is provided with projections 9 which prevent the central part of the gasket from bearing directly upon the bottom 4 of cup 3. This bottom 4 is further provided with an eccentric valve port 10 opposite which a valve pin 13 is located which is acted upon by a spring 11 and adapted to be controlled, for example, by an electromagnet 12.

The mode of operation of the valve as above described is as follows: If the valve is in the open position as illustrated in FIGURE 1 and a gaseous or liquid medium passes through the valve inlet 1 in the direction of the arrow 14, it flows outwardly through the annular outlet passage 15 in the direction of the arrows 16. A certain amount of this fluid flows, however, also in the direction of the arrow 17 through the bore 7 in the gasket 6 into the chamber 18 underneath this gasket from which it likewise passes outwardly through the valve port 10 which is at this time still fully open. If the magnet 12 is then energized to such an extent that the valve pin 13 will be lifted so as to close the valve port 10 to a certain extent, the back pressure which already exists in chamber 18 when the valve port 10 is fully open will increase and thereby cause the axially movable gasket 6 to be lifted which, in turn, results in a reduction of the size of the restricted annular outlet passage 15 and thus throttles the flow of the medium therethrough. The valve, therefore, acts as a hydrostatic relay translating the varying throttling action of controller 13 into corresponding changes in the effective area of passage 15.

If, however, the magnet is energized so as to lift the valve pin 13 completely, the valve port 10 will be closed entirely so that the back pressure in clearance 18 will increase so much that the peripheral zone 19 of gasket 6 will be pressed tightly against the valve seat 2 and thereby close the valve completely. Since the effective surface area of the lower face 8 of gasket 6 is larger than the diameter of the valve inlet 1, the outlet passage 15 will be closed very securely.

Since the cup 3 is also movable in the axial direction, i.e. in the direction of the double arrow 20, it will also serve as a movable valve member. If this cup 3 is moved toward the valve seat 2, it will also close the valve completely as the valve seat 2 bears upon an intermediate annular zone of gasket 6 outside the spacers 9. The peripheral portion 19 of gasket 6 will then be deflected downwardly toward the bottom 4 of cup 3 so as to press tightly upon the inner end of the valve port 10 and thereby close the same securely.

Figure 2:
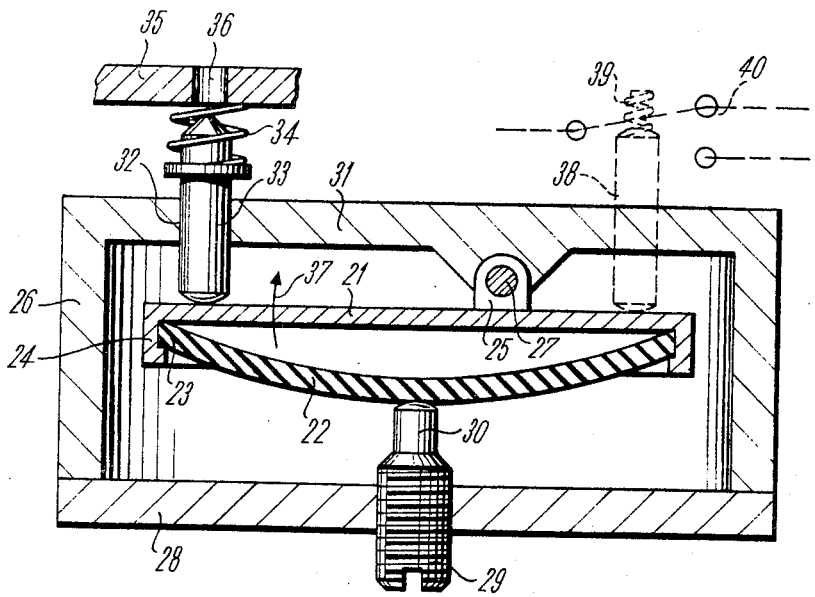
FIGURE 2 shows likewise in cross section a diagrammatic illustration of a thermostat according to the invention.

FIGURE 2 illustrates diagrammatically the thermostat according to the invention which comprises an axially symmetrical metal plate 21 and a concave diaphragm 22 of a thermoplastic material whose outer edge 23 is connected to the projecting rim 24 of plate 21. Plate 21 forms a rocker by being pivotally connected in an eccentric position by a lug 25 to a pin 27 which is rigidly secured to the thermostat housing 26. The bottom 28 of housing 26 is further provided with a setscrew 29 whose inner end 30 bears upon the center of diaphragm 22 and thus also serves as an abutment to support the rocker-like plate 21.

The upper wall 31 of housing 26 is further provided with a bore 32 in which a valve pin 33 is slidable acted upon by a spring 34 and serves for opening and closing a valve port 36 in a plate 35 which is mounted above the housing 26. When this thermostat is used in connection with a valve as illustrated in FIGURE 1, it takes the place of the electromagnet 12; valve port 36 then corresponds to the valve port 10 in the bottom 4 of cup 3, and pin 33 takes the place of pin 13 in FIGURE 1.

The mode of operation of this thermostat is as follows: If a fluid flowing through the housing 26 acts upon the thermostat and the temperature of this fluid increases, diaphragm 22 will expand considerably more than its metal supporting plate 21 with the result that the curvature of diaphragm 22 will increase and the diaphragm will exert an increased pressure upon the inner end 30 of setscrew 29. This, in turn, will cause the diaphragm 22 to exert a pressure upon plate 21 which by being pivotable at 25 on pin 27 will then be suring in the direction of the arrow 37 and thereby lift the valve pin 33 against the action of spring 34. Depending upon the increase in temperature of the fluid passing through housing 26, valve pin 33 will then close the valve port 36 either partly or entirely. At the same time, plate 21 may also act upon another pin 38, as indicated in FIGURE 2 in dotted lines, which under the action of a spring 39 may actuate, for example, an electric switch 40 or, as will be subsequently described in connection with a flow mixer as illustrated in FIGURE 4, serve as a valve pin of another valve similar to that shown in FIGURE 1.

If the temperature of the fluid flowing through the housing 26 decreases, diaphragm 22 will shrink and thereby cause the plate 21 to pivot in the direction opposite that of the arrow 37. Coil spring 34 will then press the valve pin 33 away from plate 35 and thereby open the valve port 36, while pin 38 will be lifted so as to move the switch 40 back to its original position or close another valve port.

FIGURES 3 and 4 illustrate an appliance, a so-called flow mixer, for mixing two fluids or currents of different temperatures as, for example, hot and cold water. This appliance is equipped with a twin valve forming a combination of two of the valves of the type diagrammatically illustrated in FIGURE 1, and with a thermostat similar to that as shown in FIGURE 2. This flow mixer comprises a housing 41 which has a front opening covered by a plate 42 and is provided with two inlets 43 and 44 which are to be connected to hot- and cold-water pipes. This housing 41, whose interior also serves as a mixing chamber 45 for the hot and cold water, is further provided with a common outlet opening 46 through which the mixed water is discharged.

Opposite the two inlets 43 and 44 the chamber 45 of the housing contains a common valve-supporting plate 47 which has a stepped cylindrical rim 48 which, in turn, rests on a supporting plate 49 which extends parallel to the valve plate 47. This supporting plate 49 has integrally thereon a central socket 50 which, by a screw thread 51, is screwed into an adjusting sleeve 52 which is rotatably mounted in the housing plate 42 and held in a fixed position at one end by a flange 53 and at the other end by an adjusting ring 54 whose upper end is acted upon by a spring ring 55. This adjusting sleeve 52 is, in turn, connected to an adjusting disk 56 which carries a control lever 57.

The sides of valve plate 47 opposite the two inlets 43 and 44 are provided with two valve cups 58 and 59 each of which contains a gasket disk 60 or 61, respectively, similar to the gasket 6 in FIGURE 1. At a location offset from to the central axis of each of these valve cups 58 and 59, valve plate 47 is provided with a valve port 62 and 63, respectively, into each of which the conical end of a closure pin 64 or 65 extends. These two valves on plate 47 are operatively associated with the end surfaces 66 and 67 of the inlets 43 and 44 in the same manner as described with reference to the valve according to FIGURE 1.

Adjacent to the two valve ports 62 and 63 the underside of valve plate 47 is further provided with an annular collar 68 having an annular groove 69 in which a diaphragm 70 of a thermoplastic material is mounted which is arcuately curved in the direction toward the supporting plate 49. Underneath this diaphragm 70 a rocker 71 is located which is swingably mounted on a pivot pin 72 offset from the central axis of diaphragm 70. Within this central axis of diaphragm 70 the rocker 71 contains a coupling element in the form of a setscrew 73, one end 74 of which bears upon the center of diaphragm 70. The two arms 75 and 76 of rocker 71 support and act upon the two valve pins 64 and 65 against the action of springs, not shown, similar to the spring 34 in FIGURE 2. Diaphragm 70 represents a movable output element of a thermostat also including the rocker 71.

In order to permit the setscrew 73 to be turned, an adjusting screw 77 is rotatably mounted within the socket 50 on the supporting plate 49 and connected by an omega-shaped leaf spring 78 to setscrew 73 so that a rotation of the adjusting screw 77 will be transmitted to the setscrew 73 and a resilient pressure will at the same time be exerted by this spring 78 upon the rocker 71. The head 79 of screw 77 is provided with a control knob 80.

The mode of operation of the apparatus as above described is as follows: at first, the control knob 80 on the adjusting screw 77 is turned so that the arrow 81 on its front side, as shown in FIGURE 3, points to the desired temperature value on the graduated scale 82. This adjustment of the control knob 80 is also transmitted by the leaf spring 78 to setscrew 73 which thereby adjusts the rocker 71 to the desired position relative to the diaphragm 70. If the control lever 57 is then also turned in the direction of the arrow 83, the adjusting sleeve 52 will draw back the supporting plate 49 and thus also the valve plate 47 to such an extent that the gaskets 60 and 61 will be separated from the valve seats 66 and 67. The hot and cold water currents can then flow from the inlets 43 and 44 through the annular outlets 84 and 85 to the inside 45 of housing 41 in which they will be thoroughly mixed with each other and then flow out of the housing 41 through the outlet opening 46. During this flow, the water mixture also passes through the central opening 86 and alongside the diaphragm 70 which is thereby heated and expands considerably more than the valve plate 47. Owing to this expansion, the curvature of diaphragm 70 increases and exerts through the setscrew 73 a pressure upon the rocker 71 which is thereby pivoted against the action of the curved leaf spring 78 in the direction of the arrow 87 so that the valve pin 64 will be lifted and valve pin 65 will be lowered. This has the result that the back pressure rises in valve cup 58 underneath the gasket 60 so that the outer edge portion of the latter is lifted and thereby reduces the cross-sectional area of the outlet 84 of this valve with the result that a smaller amount of hot water will flow to the inside 45 of the housing which serves as a mixing chamber. The reverse procedure occurs in the valve which is associated with the cold-water inlet 44 since the valve pin 65 is then lowered and the back pressure which might still be present underneath the gasket 61 will decrease so that the outer edge portion of this gasket will be lowered and thereby increase the cross-sectional area of the annular outlet opening 85 of this valve. As soon as the water has reached the desired temperature as set by the control knob 80, the rocker 71 and thus also the two valve pins 64 and 65 will also be in the position in which a constant flow of water of the desired temperature through the outlet opening 46 is insured.

If the water is to be shut off, the control lever 57 is to be turned back to its off position in the direction opposite that of the arrow 83, whereby he valve plate 47 will be shifted so far toward the valve seats 66 and 67 that the gaskets 60 and 61 will be firmly pressed against them and close the restricted flow passages 84 and 85 tightly. When the two valves are thus shut off, two fixed pins 88 and 89 which are mounted centrally within the inlets 43 and 44 will also plug the bores 90 and 91 in gaskets 60 and 61. Gaskets 60 and 61 together with pins 88 and 89 then operate as check valves.

Figure 5:
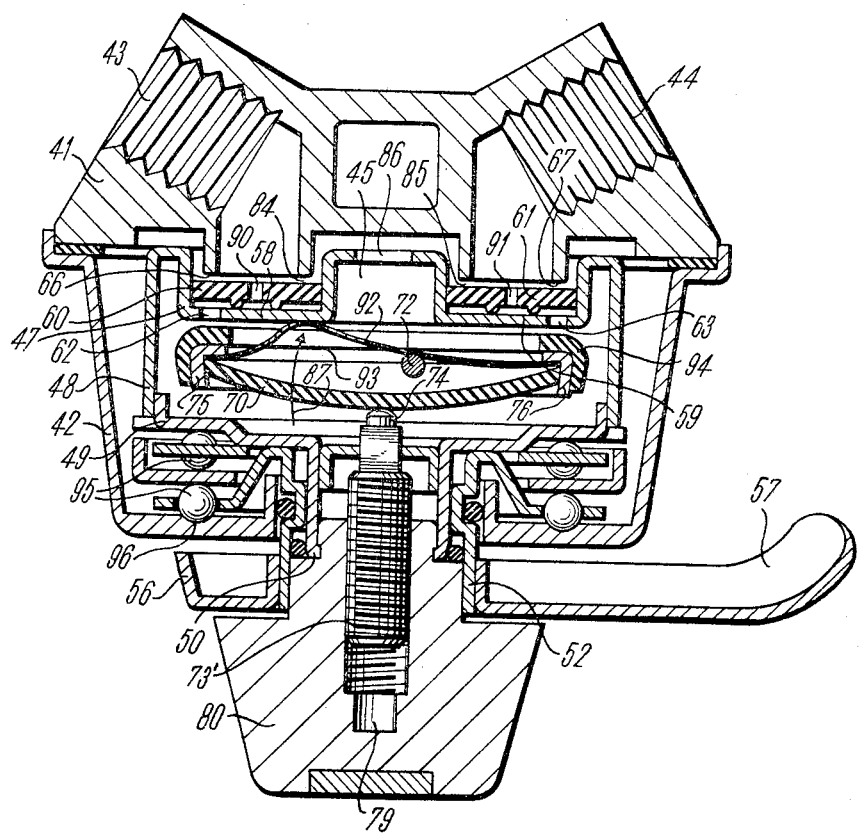
FIGURE 5 shows a longitudinal section of a mixing appliance according to another embodiment of the invention.

FIGURE 5 finally illustrates a modification of the mixing appliance according to the invention. Since the construction of this apparatus is fundamentally the same as that described with reference to FIGURE 4, the corresponding components of both apparatus are designated by the same reference numerals. The principal difference of this embodiment of the invention from that according to FIGURE 4 consists in the fact that the diaphragm 70 is not firmly secured to the valve plate 47 but is mounted on the rocker 93 which in this case is disk-shaped and acted upon by a leaf spring 92. Furthermore, the outer edge portion of this frame-shaped rocker 93 carries an elastic ring 94 of a suitable sealing material which confronts the valve ports 62 and 63 of the valve cups 58 and 59. This sealing ring 94 carries out the function of the closure pins 64 and 65 of the apparatus according to FIGURE 4 which are therefore omitted in this embodiment of the invention.

A further difference between the apparatus according to FIGURE 5 and that according to FIGURE 4 consists in the fact that the control lever 57 acts upon a ball bearing 95 whose balls are movable along a helically ascending race 96 so that, when the control lever 57 is turned, the supporting plate 49 as well as the valve plate 47 will be shifted in the axial direction .

A bolt 73′ projecting from setting knob 80 acts as a pressure member bearing upon the convex side of the arcuate central part of diaphragm 70 to vary the force of spring 92 which acts as a pressure-transmitting element between thermostat 70, 93 and valve support 47.

The mode of operation of this mixing appliance according to FIGURE 5 is practically the same as that of the appliance as described with reference to FIGURE 4 insofar as the expansion of diaphragm 70 also results in a pivoting movement of the rocker 93 which, in turn, affects the gaskets 60 and 61 so as to vary the cross-sectional area of the outlet openings 84 and 85.

Since the two mixing appliances according to FIGURES 4 and 5 are both provided with a free outflow, the adjustment of the rate of flow is entirley independent of the supply or inlet pressure of the water or other fluids to be controlled. Variations of this supply pressure will be compensated by corresponding deformations of the gaskets 60 and 61 and corresponding changes in the cross-sectional area of the outlet openings 84 and 85. Furthermore, when the mixing ratio is changed, a compensation will also occur between the quantities of the two fluids as supplied. This, in turn, insures that the rate of flow through the appliance will remain constant at any time.

Since the plastic diaphragm 70 responds very quickly to any changes in the temperature of the mixture of the two fluid currents, the outlet temperature will always be exactly as selected. If for any reason the supply of cold water should be interrupterd, the pivoting movement of rocker 71 or 93 which is caused by the increase in the average temperature will cause the valve port 62 of the hot-water valve and thus also the valve itself to be completely closed immediately. Consequently, this apparatus insures absolute protection from possible scalding without requiring a special check valve or any other safety devices.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, I claim:

1. A thermostatic flow mixer comprising a housing forming a mixing chamber and having two inlets and one outlet for conducting two separate fluid currents of different temperatures into said chamber and discharging the resulting mixture therefrom, a valve seat on the inner end of each of said inlets, a valve support within said chamber movable toward and away from both of said valve seats, said valve support forming a pair of cups each having an open side and a bottom, said valve seats projecting into the open sides of said cups, a gasket in each of said cups confronting the respective valve seat and defining a restricted passage therewith, each of said cups having an inner diameter larger than the outer diameter of the associated valve seat to establish a flow path from said restircted passage to said outlet, the bottom of each of said cups having an opening forming a valve port, each of said gaskets having at least one small aperture, spacing means separating each gasket from the bottom of the associated cup so as to form a clearance communicating with the respective inlet through said aperture and with said chamber through said valve port, control means for moving said valve support with said gasket in said cups relatively to said valve seats for opening and closing said passages, a thermostat within said chamber responsive to the temperature of said mixture and provided with a movable output element bearing upon said valve support for opening and closing at least one of said valve ports upon changes in said temperature, and setting means for manually adjusting said thermostat in accordance with the desired temperature of said mixture.

2. A flow mixer as defined in claim 1 wherein said cups are provided with closure means for separately blocking and unblocking their respective valve ports, said output element being differentially connected with said closure means for concurrently closing one and opening the other of said valve ports.

3. A flow mixer as defined in claim 2 wherein said thermostat comprises a rocker having a pivot located at different distances from said valve ports, said rocker having opposite extremities operatively coupled with said closure means.

4. A flow mixer as defined in claim 3 wherein said output element comprises an expansion member of a material having a high coefficient of expansion operatively coupled with said rocker for swinging same about said pivot.

5. A flow mixer as defined in claim 4 wherein said expansion member is a diaphragm of thermoplastic material peripherally connected with said valve support and having a central part arcuately curved toward an intermediate point of said rocker, further comprising adjustable coupling means between said central part and said rocker for varying the pressure of said diaphragm upon said intermediate point.

6. A flow mixer as defined in claim 4 wherein said expansion member is a diaphragm of thermoplastic material peripherally connected with said rocker and having a central part arcuately curved away from said rocker, further comprising adjustable pressure means on said housing adapted to act upon the convex side of said central part and pressure-transmitting means between said rocker and said valve support.

7. A flow mixer as defined in claim 3 wherein said closure means comprises a pair of pins respectively insertable into said valve ports.

8. A flow mixer as defined in claim 3 wherein said rocker is frame-shaped, said closure means comprising a ring of resilient material carried on the periphery of said rocker and confronting said valve ports.

9. A flow mixer as defined in claim 1, further comprising plug means in said inlets for closing the apertures of said gaskets upon engagement thereof with the associated valve seats.

10. A thermostatic flow mixer comprising a housing forming a mixing chamber and having two inlets and one outlet for conducting two separate fluid currents of different temperatures into said chamber and discharging the resulting mixture therefrom, a valve seat on the inner end of each of said inlets, a valve support within said chamber movable toward and away from both of said valve seats, a pair of valve members on said support respectively confronting said valve seats and defining restricted passages therewith in a flow path from said inlets to said outlet, said members being provided with valve ports bypassing said restricted passages, blocking means at each of said valve members for adjustably throttling said ports, hydrostatic relay means at each of said valve members for translating a variation in the throttling effect of said throttling means upon the respective port into a corresponding variation in the width of the respective restricted passage, control means for moving said valve support with said valve members relatively to said valve seats for opening and closing said pasages, a thermostat within said chamber responsive to the temperature of said mixture and provided with a movable output element bearing upon said valve support for opening and closing at least one of said valve ports upon changes in said temperature, and setting means for manually adjusting said thermostat in accordance with the desired temperature of said mitxure, said output element being differentially connected with said blocking means for concurrently closing one and opening the other of said ports.

References Cited
UNITED STATES PATENTS 3,352,489  11/1967  Coulombe et al. _____ 236—12

WILLIAM E. WAYNER, Primary Examiner

U.S. Cl. X.R.

137—607; 236—101